No. 705,130. Patented July 22, 1902.
J. C. PERRY.
HOOP MAKING MACHINE.
(Application filed Apr. 7, 1902.)

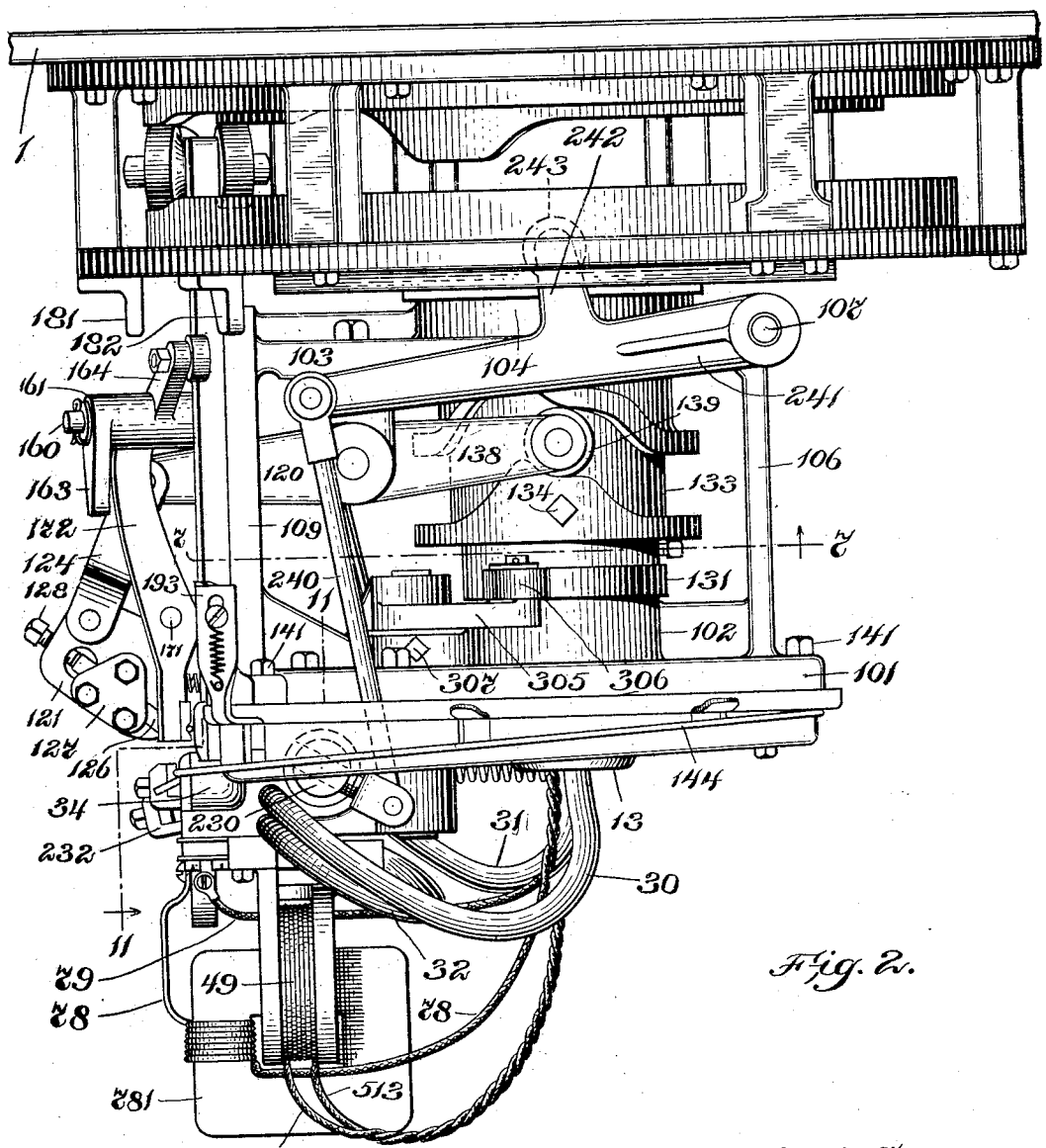

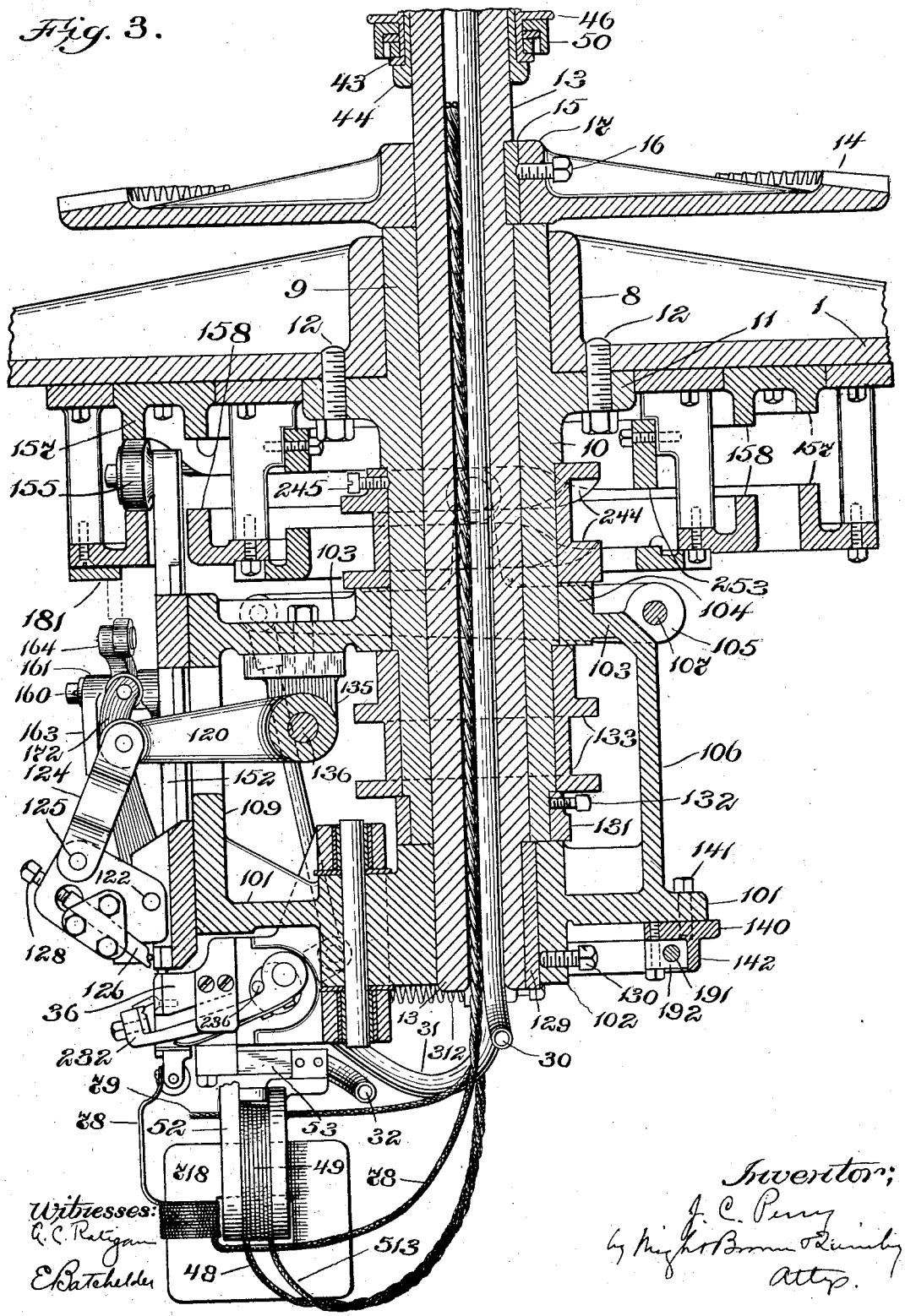

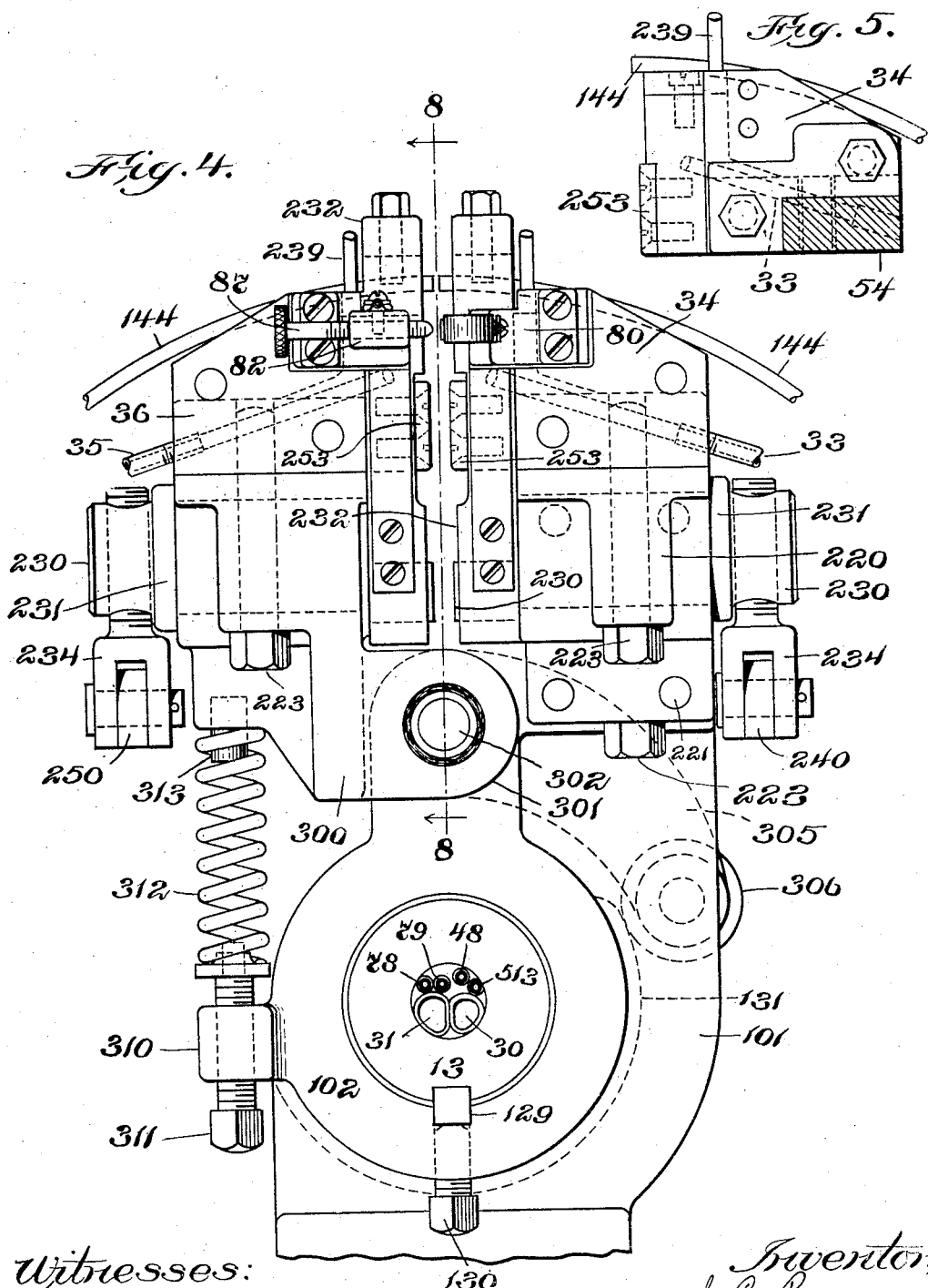

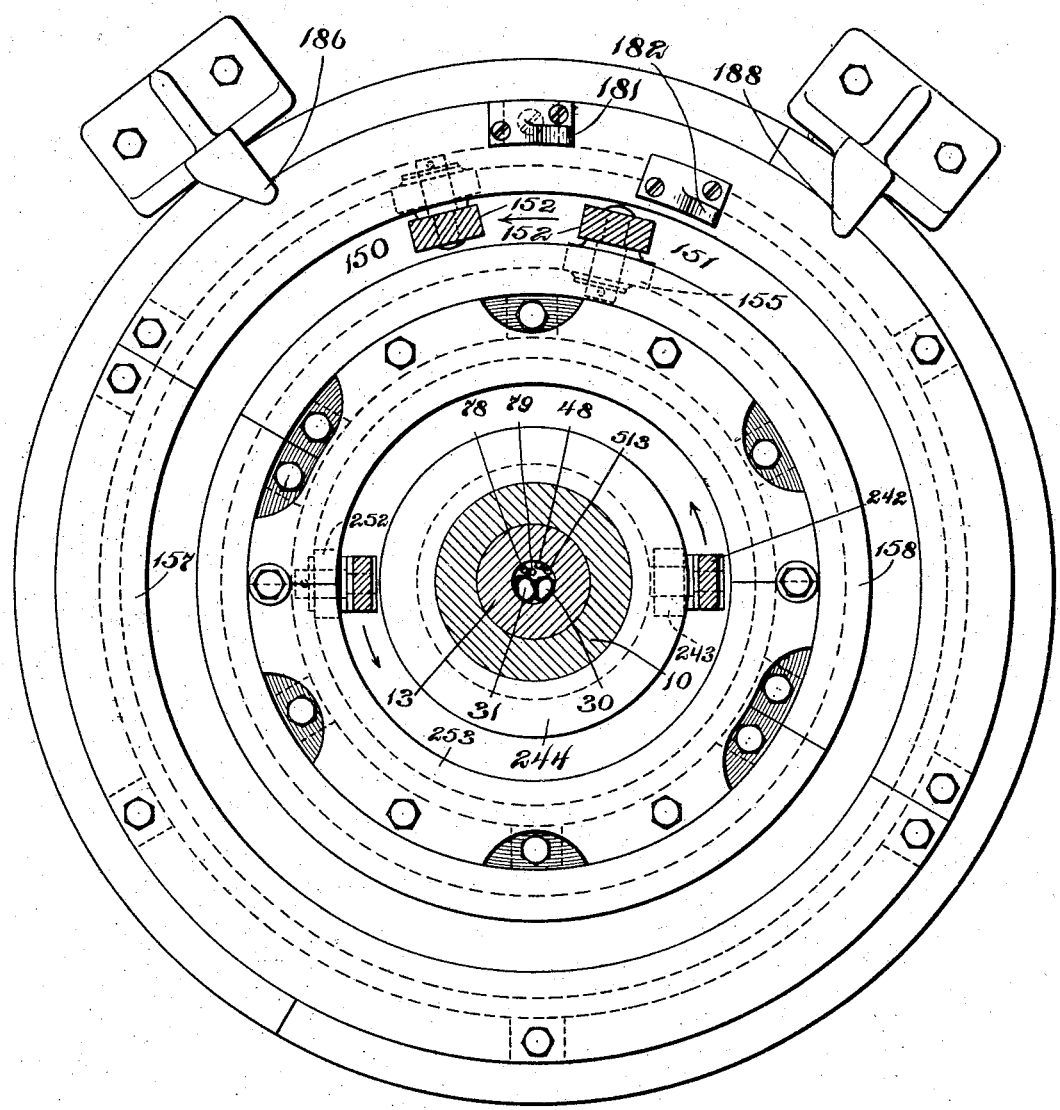

(No Model.) 15 Sheets—Sheet 6.

Witnesses:
Adeline C. Ratigan
E. Batchelder

Inventor:
J. C. Perry
by Knight Brown & Quinby
Attys.

No. 705,130. Patented July 22, 1902.
J. C. PERRY.
HOOP MAKING MACHINE.
(Application filed Apr. 7, 1902.)
(No Model.) 15 Sheets—Sheet 7.

Witnesses:
Adeline C. Ratigan
E. Batchelder

Inventor:
J. C. Perry
by Knight Brown & Quinby
Attys.

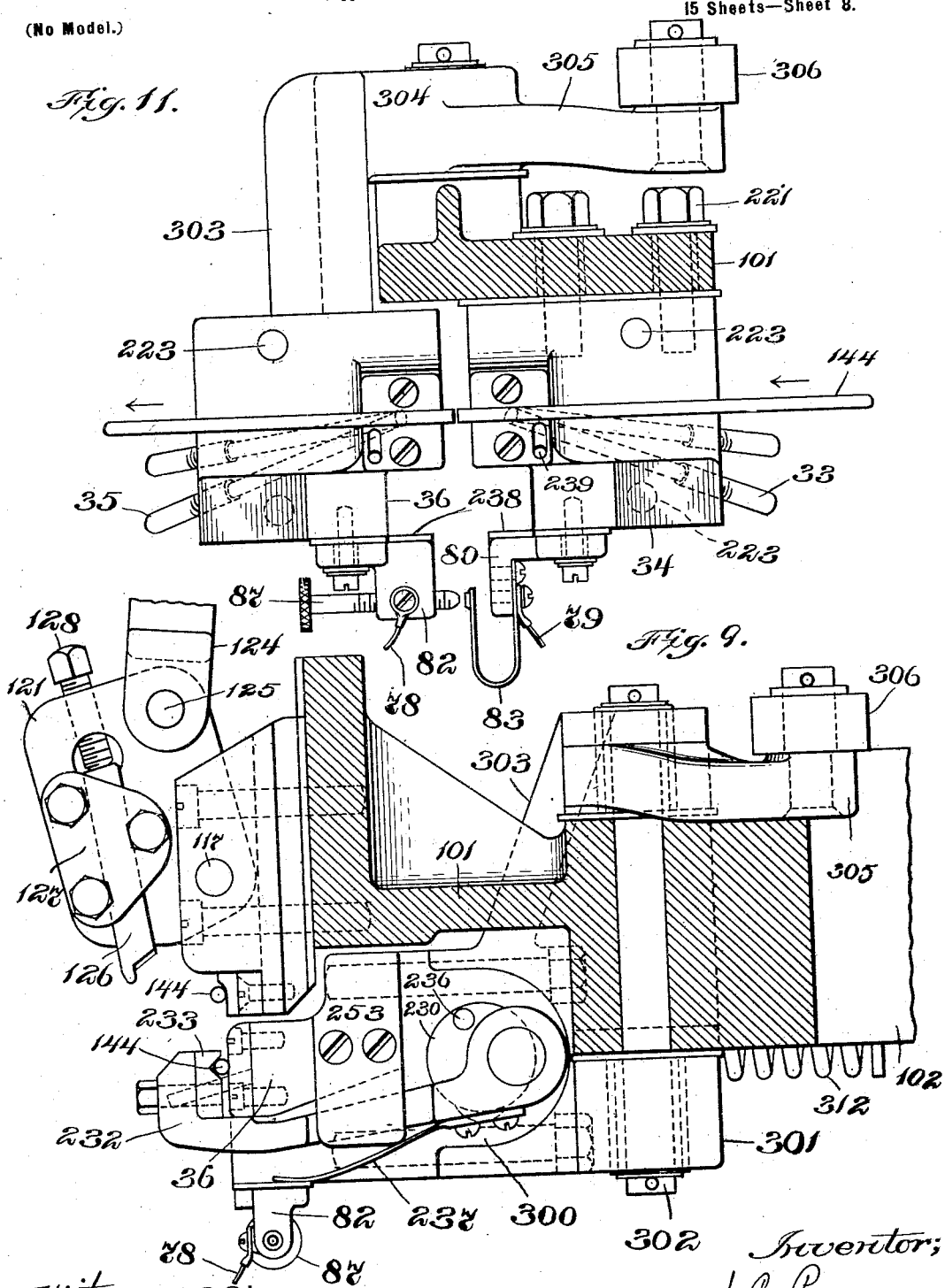

No. 705,130. Patented July 22, 1902.
J. C. PERRY.
HOOP MAKING MACHINE.
(Application filed Apr. 7, 1902.)
(No Model.) 15 Sheets—Sheet 9.
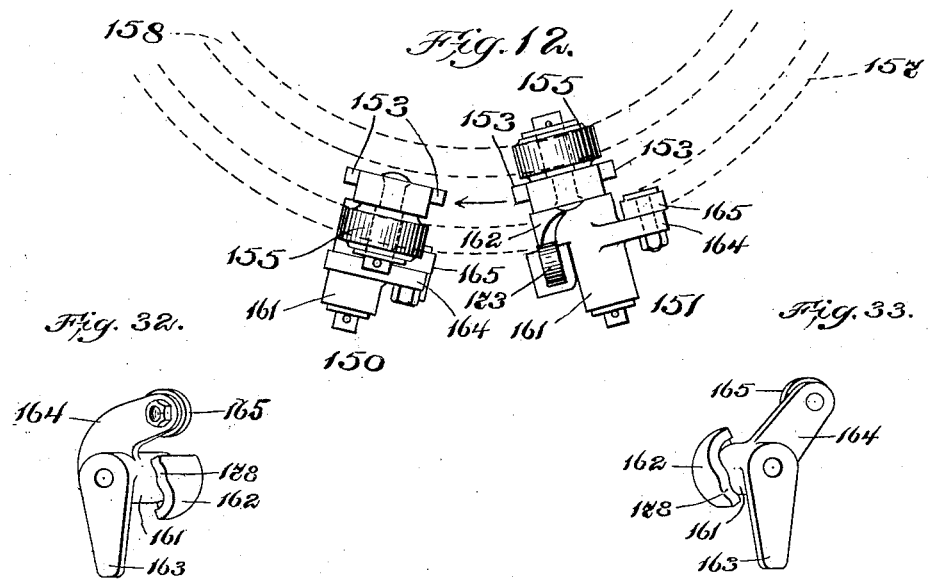
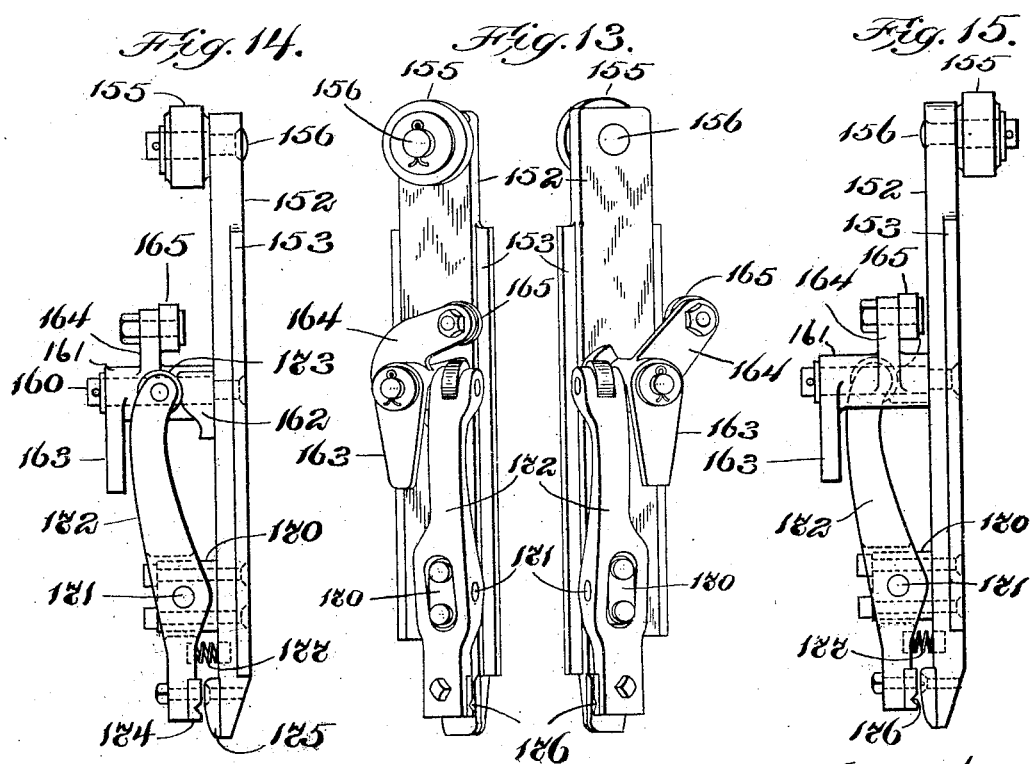
Witnesses:
Adeline C. Ratigan
E. Batchelder
Inventor:
J. C. Perry
by Knight Brown & Quinby
Attys.

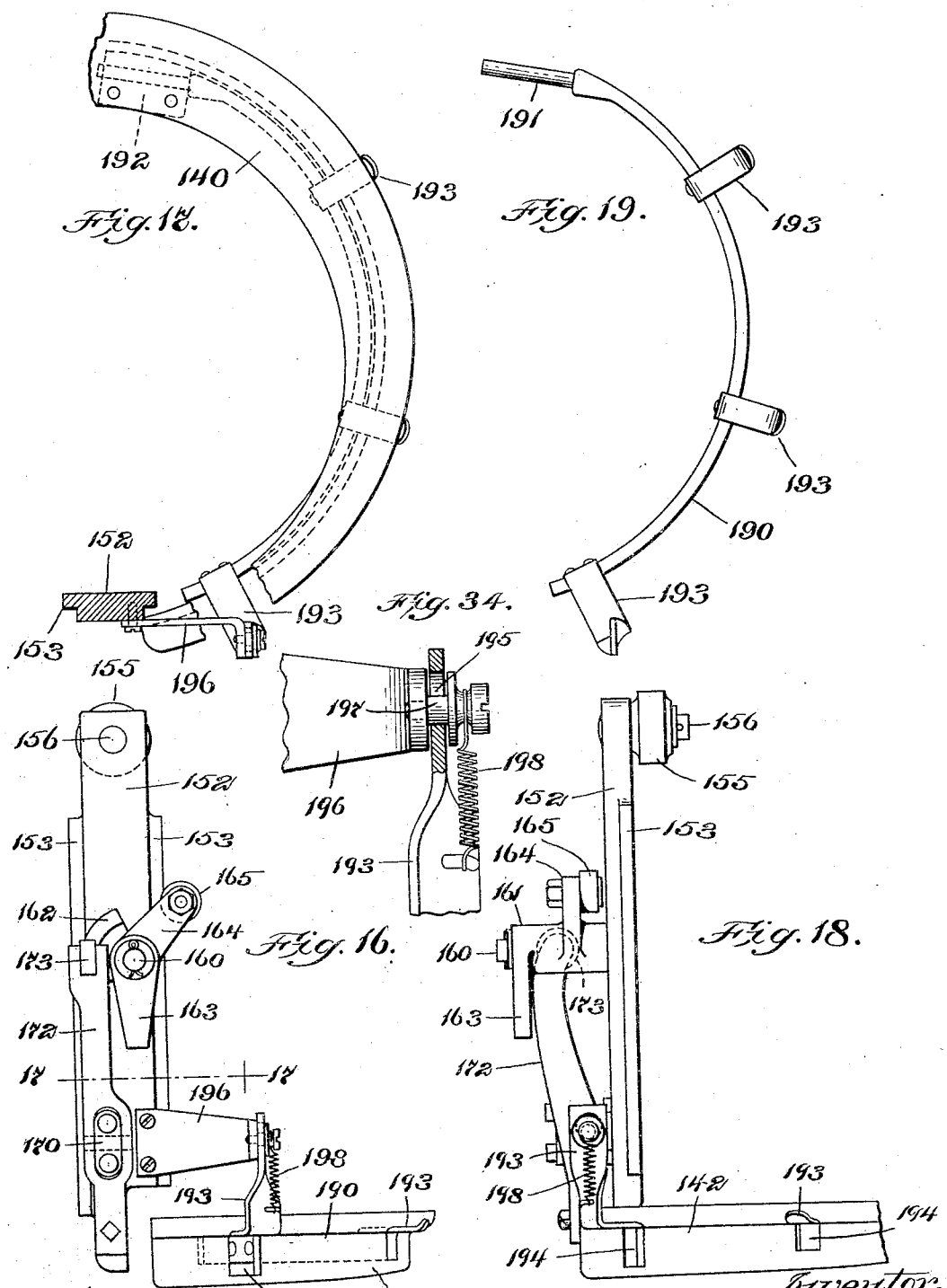

No. 705,130. Patented July 22, 1902.
J. C. PERRY.
HOOP MAKING MACHINE.
(Application filed Apr. 7, 1902.)
(No Model.) 15 Sheets—Sheet 11.

Witnesses;
Adeline C. Ratigan
E. Batchelder

Inventor;
J. C. Perry
by Wright Brown & Quinby
Atty

No. 705,130. Patented July 22, 1902.
J. C. PERRY.
HOOP MAKING MACHINE.
(Application filed Apr. 7, 1902.)
(No Model.) 15 Sheets—Sheet 13.

Witnesses:
Adeline C. Ratigan
E Batchelder

Inventor:
J. C. Perry

No. 705,130. Patented July 22, 1902.
J. C. PERRY.
HOOP MAKING MACHINE.
(Application filed Apr. 7, 1902.)
(No Model.) 15 Sheets—Sheet 14.

Witnesses:
Adeline C. Ratigan
E Batchelder

Inventor;
J. C. Perry
by Wright Brown & Quinby
Attys.

No. 705,130. Patented July 22, 1902.
J. C. PERRY.
HOOP MAKING MACHINE.
(Application filed Apr. 7, 1902.)
(No Model.) 15 Sheets—Sheet 15.

Witnesses:
Adeline C. Ratigan
E. Batchelder

Inventor,
J. C. Perry
by Hugh R. Brown Quinby
Atty.

UNITED STATES PATENT OFFICE.

JOHN C. PERRY, OF CLINTON, MASSACHUSETTS.

HOOP-MAKING MACHINE.

SPECIFICATION forming part of Letters Patent No. 705,130, dated July 22, 1902.

Application filed April 7, 1902. Serial No. 101,748. (No model.)

*To all whom it may concern:*

Be it known that I, JOHN C. PERRY, of Clinton, in the county of Worcester and State of Massachusetts, have invented certain new and useful Improvements in Hoop-Making Machines, of which the following is a specification.

This invention has for its object the provision of a machine for making endless bands or hoops.

Reference is to be had to the accompanying drawings, forming a part of this specification, the same characters being used to designate the same parts wherever they occur.

Figure 1:
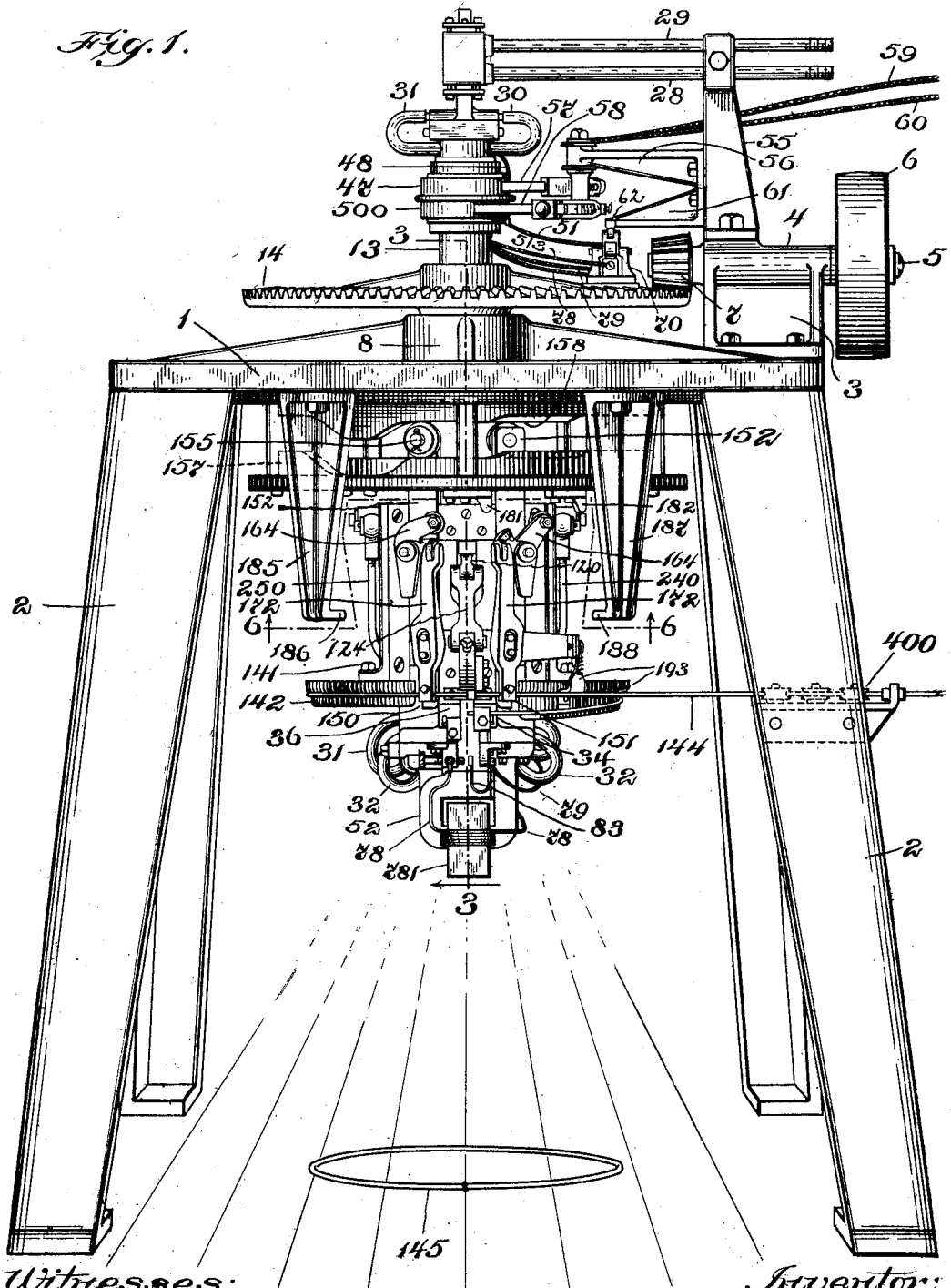
Figure 8:
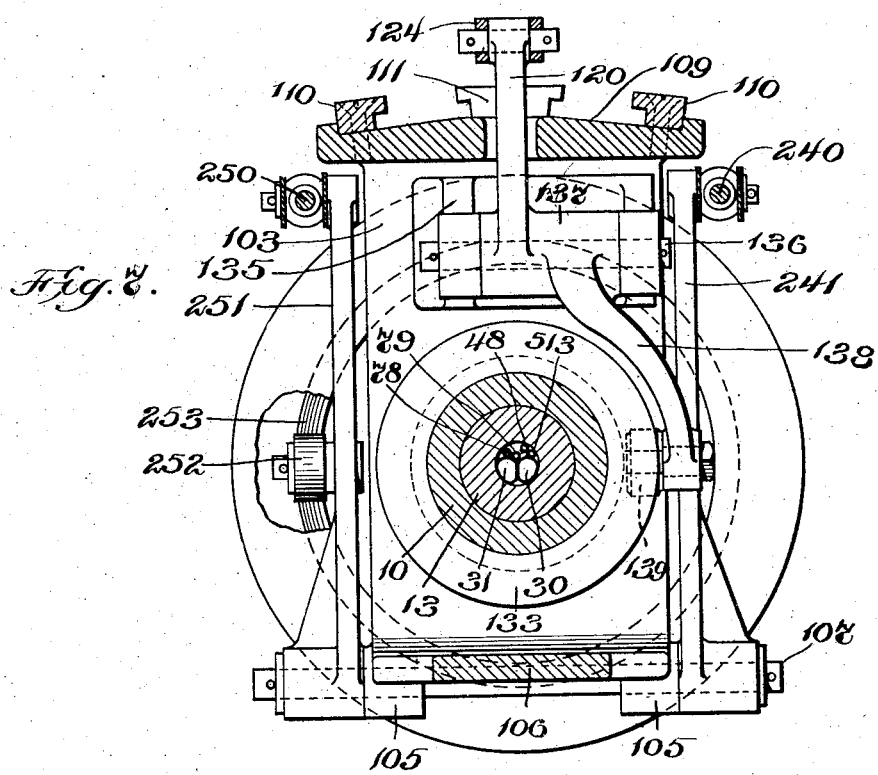
Figure 29:
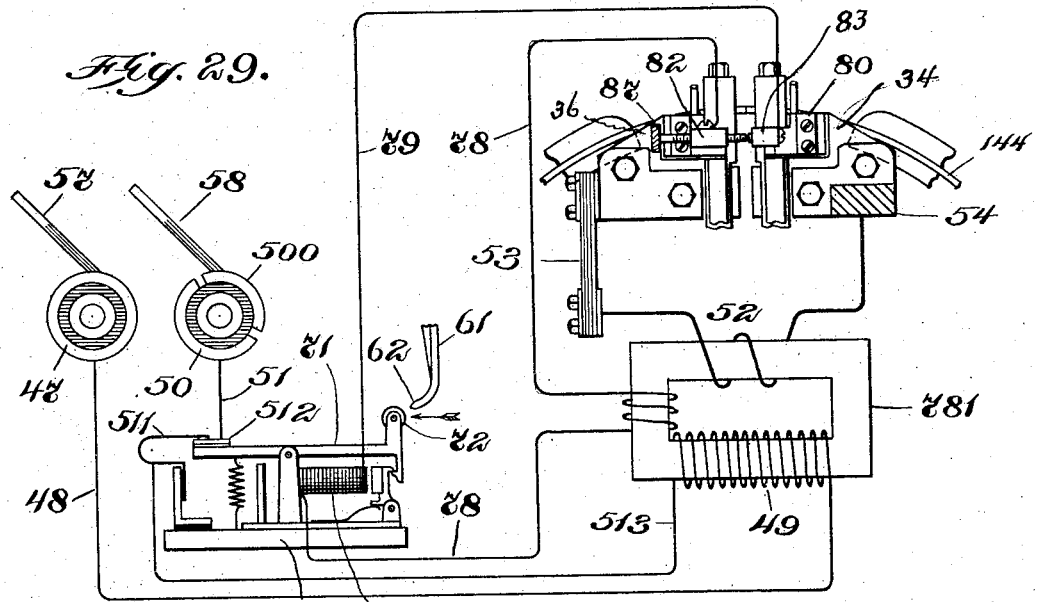
Figure 8:
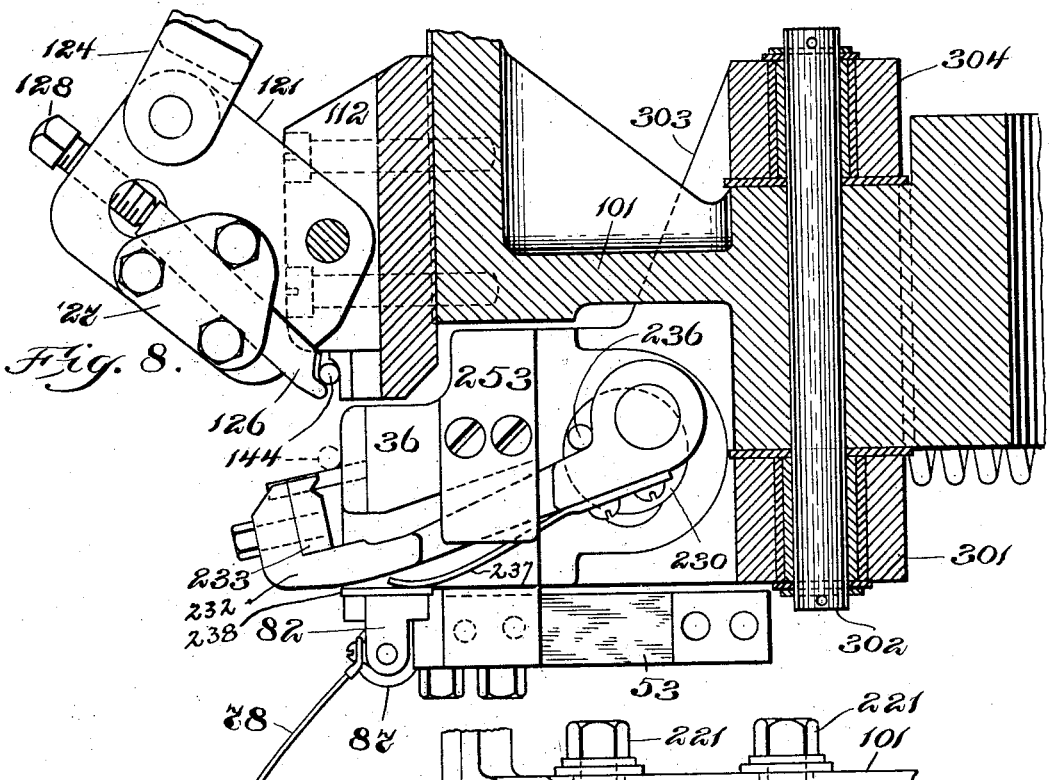
Figure 10:
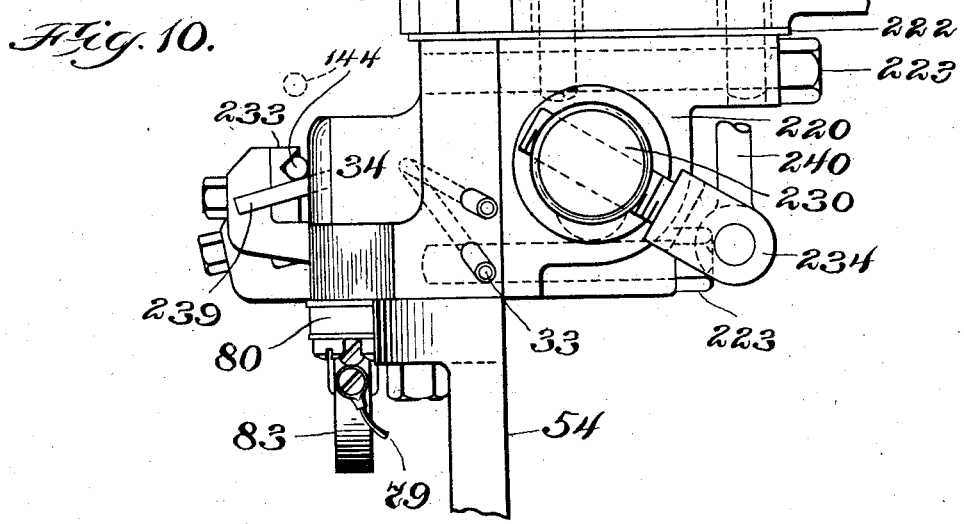
Figure 20:
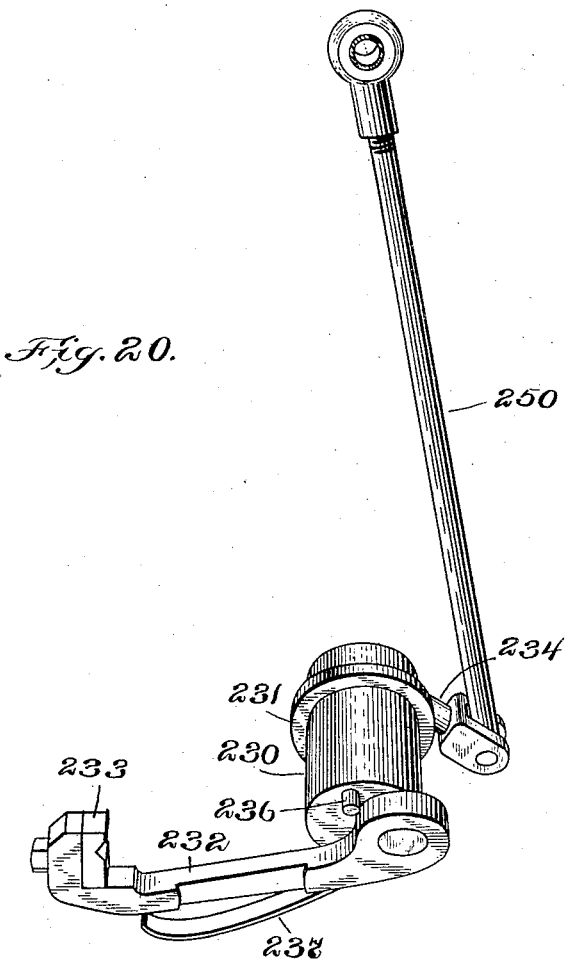
Figure 21:
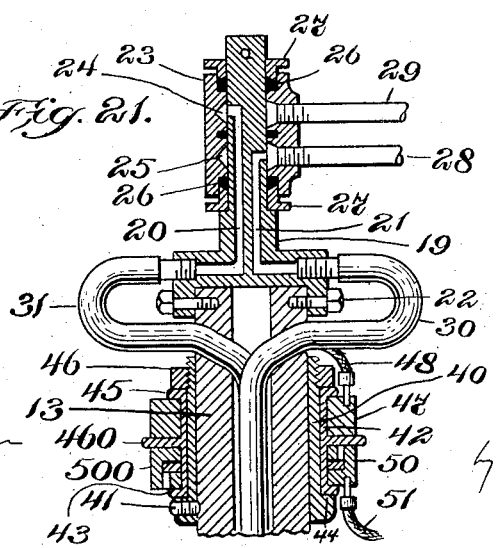
Figure 22:
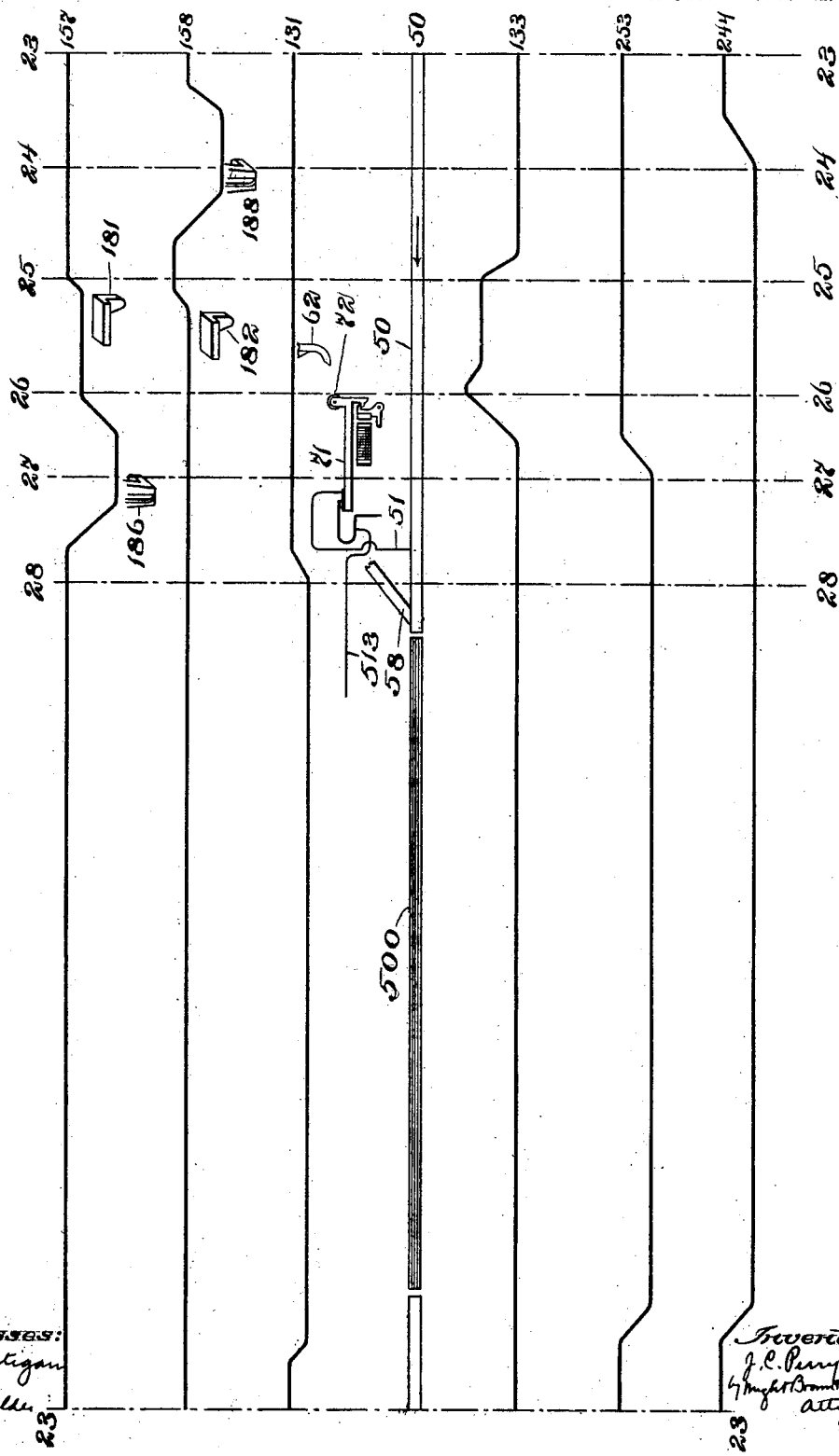
Figure 23:
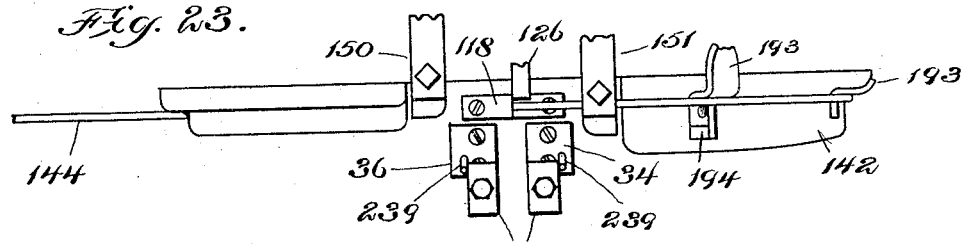
Figure 28:
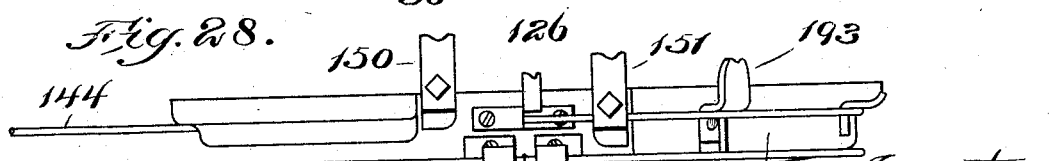
Figure 30:
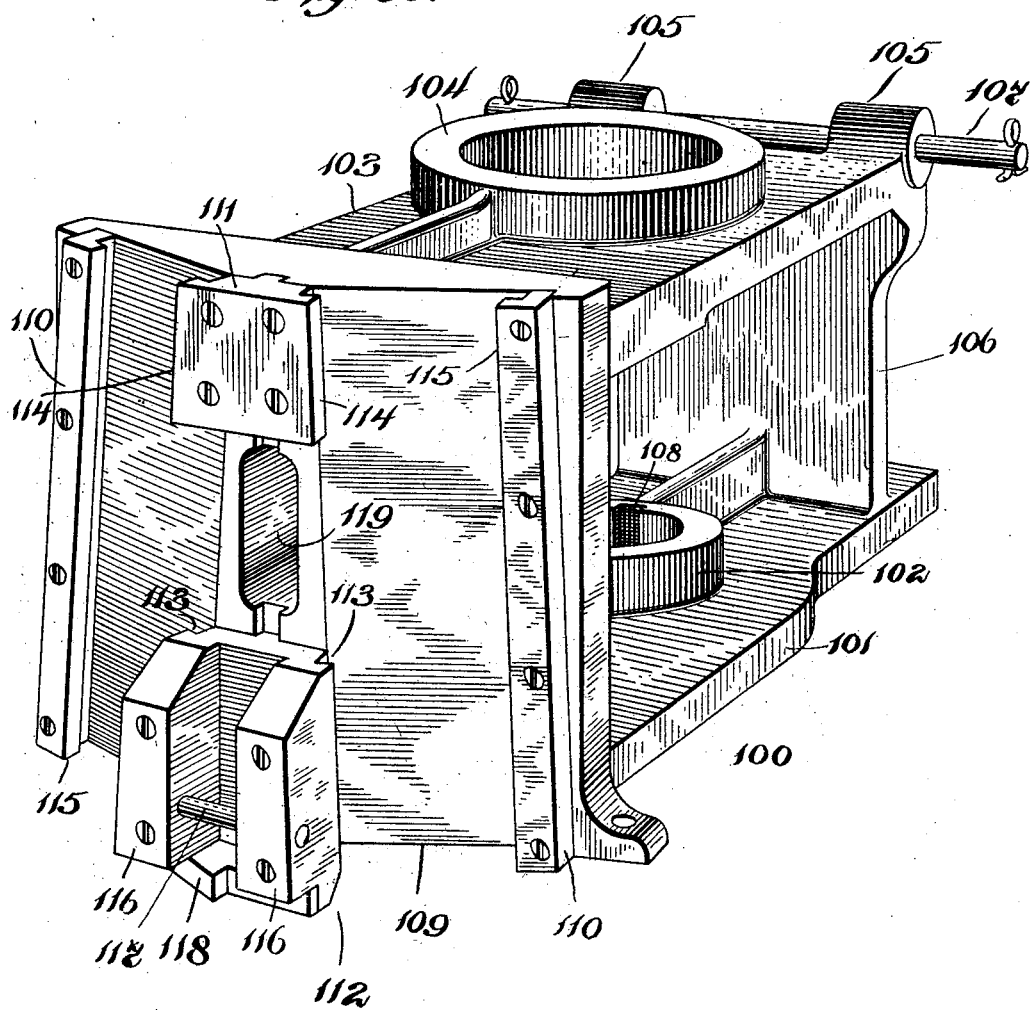
Figure 31:
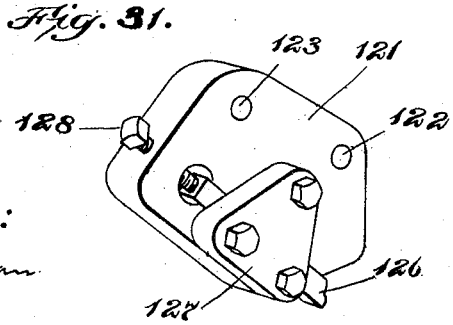
Figure 85:
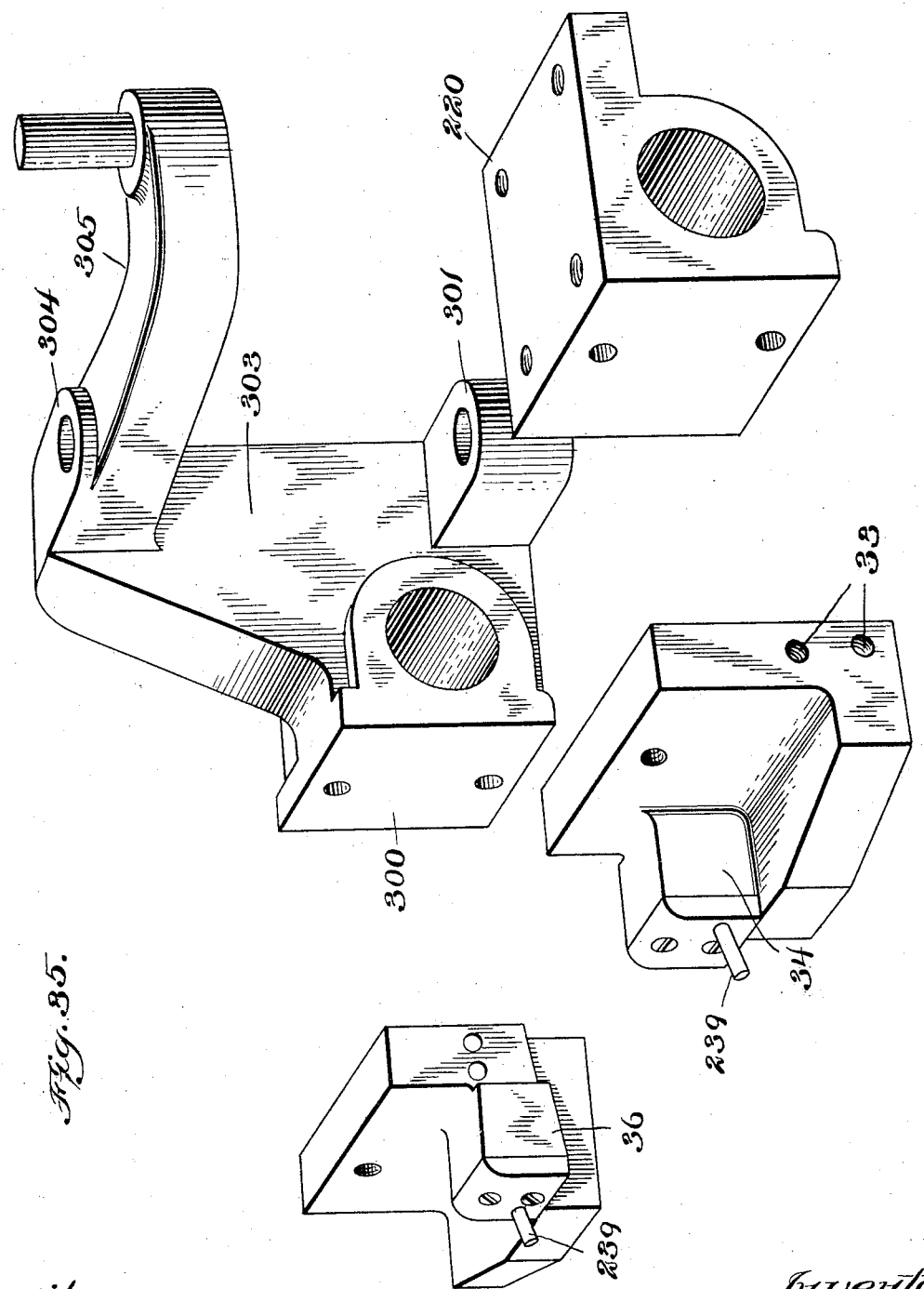

Figure 1, in front elevation, shows a machine constructed in accordance with my invention, the wire being shown fed in from the right of the machine onto the drum or "former" a sufficient amount to pass around the drum of the machine, the next operation of the machine being that of severing the wire to form the loop or hoop, as hereinafter described. Fig. 2 is a side elevation of the mechanism shown in Fig. 1 below the supporting-table, the release-fingers being omitted, the parts being arranged as in Fig. 1. At the lower end of the figure appear the primary wires for the transformer and the circuit-breaker wires, also the pipes by which water is provided for cooling the welding-jaws. Fig. 3 is a vertical sectional view on the line 3 3 of Fig. 1 looking in the direction of the arrow, the section plane passing between the two welding-jaws in their separated position. Fig. 4 is a detail reverse plan view of the welding-jaws, the feeding-clamps being removed and the transformer and its terminals being omitted in order to show the parts above them. Fig. 5 is a detail view of one of the welding-jaws, showing one of the transformer-terminals in position on the jaw. Fig. 6 is a cross-sectional view on the line 6 6 of Fig. 1, looking in the direction of the arrow or toward the top of the machine, showing the arrangement of the several cam-tracks. Fig. 7 is a cross-sectional view on the line 7 7 of Fig. 2, looking in the direction of the arrow or toward the top of the machine, showing the cutter-lever and the cam by which the same is operated, also the welding-jaw, grip-levers, and the cams by which they are operated. Fig. 8 is a vertical sectional view on the line 8 8 of Fig. 4 looking in the direction of the arrow or in the direction of the rotation of the head and toward the side of the forward welding-jaw and showing the forward welding jaw—that is to say, the jaw that is ahead in the rotation of the machine—with its grip lowered or opened. Above this jaw appears the cutter shown closed upon the wire ready to sever the latter, the point of operation of the latter being above the two welding-jaws and in a plane passing between the latter. The cutter-head in this view is shown in full line. Fig. 9 is a view similar to Fig. 8, showing the forward welding-jaw with its grip raised or closed and the cutter open. In this view also appear the detachable contact-pieces of the welding-jaws, there being a contact-piece on the face of the grip and a complemental contact-piece carried by a relatively stationary shoulder of the jaw. Fig. 10 is a side elevation of the rear welding-jaw, the grip of the latter being shown as closed. This figure also shows the channel drilled in the clamp for the passage of water for cooling the jaws. Fig. 10$^a$ is a reversed plan view, showing the manner of connecting the water-pipes with the water-channel of each welding-jaw and of connecting the water-channel of the two welding-jaws together. Fig. 11 is a partial sectional view on the line 11 11 of Fig. 2 looking in the direction of the arrow or toward the front faces of the welding-jaws as they appear in Fig. 1. In this view the cutter and the welding-grips are removed, showing the position of the wire and of the water-channels and also showing the arrangement of the adjustable contact-screw, its complemental spring-contact, and the terminals of the wire of the breaker-circuit connected to said spring and screw. Fig. 12 is a top plan view of the two wire-feeding clamps and their rollers, the cam-tracks for the latter appearing in dotted lines, there being a feeding-clamp for each welding-jaw, as shown in Fig. 1 and Figs. 23 and 28, the clamp to the left being termed the "forward" clamp and the clamp to the right the "rear" clamp to designate their respective position in the rotation of the machine. Fig. 13 is a front elevation of the two feeding-clamps as they appear in Fig. 12 and in Fig. 1. Fig. 14, in side elevation, shows the forward feeding-clamp closed. Fig. 15, in side elevation, shows the rear feeding-clamp closed. Fig. 16 is a front elevation of the rear feeding-clamp, showing a part of the former or drum and the wire-positioning bar and its fingers carried and operated by the clamp. Fig. 17 is a sectional view of the parts shown in Fig. 16, taken on the line 17 17 of Fig. 16. Fig. 18 is a side elevation of the parts shown in Fig. 16. Fig. 19 is a detail top plan view of the wire-positioning bar and its fingers. Fig. 20 is a detail perspective view showing the forward welding-jaw grip and the lever connection whereby said grip is operated. Fig. 21 is a vertical sectional view of the water head or top of the machine shown in Fig. 1, the section shown in this figure being a continuation of what is shown in Fig. 3. Fig. 22 is a diagram showing the order of action of the various cams and the stationary fingers in relation thereto. The cams are developed on a plane, the distance between the lines marked 23 being three hundred and sixty degrees and the order of action being from right to left in this figure, the cams being stationary. The ring 50 and break-switch 71 in this diagram are shown as moving, while the brush 58 is stationary. The ring and break-switch are shown as they would be at the beginning of a weld, that part of the ring marked 50 having just passed under the brush 58. The part of the ring marked 500 is insulated from the part marked 50, so that no current can flow into the machine when the brush 58 is on the part marked 500. Figs. 23, 24, 25, 26, 27, and 28 are diagrammatic views showing the relative position of the various clamps at different points in the revolution of the machine corresponding to the lines 23, 24, 25, 26, 27, and 28 in Fig. 22. Fig. 29 is a diagrammatic view showing the welding-jaws, their electric circuits, and accessories. Fig. 30 is a detail perspective view of the revolving head of the machine, upon which are mounted the mechanisms by which the blank is fed, shaped, cut, and welded. Fig. 31 is a detail perspective view of the cutter-head and its cutter carried by the revolving head. Fig. 32 is a detail perspective view of the forward feeding-clamp cam. Fig. 33 is a detail perspective view of the rear feeding-clamp cam. Fig. 34 is a detail view showing the connection between the positioning-bar and the rear feeding-clamp. Fig. 35 is a perspective view of the welding-jaws and their supporting-castings.

The table 1 of the machine and its supporting-legs 2 may be of any preferred construction.

3 represents a bracket secured to the top of the table 1, (see Fig. 1,) formed with a bearing 4, in which is arranged a shaft 5.

6 represents a driving-pulley fast upon one end of the shaft 5.

7 represents a bevel-gear fast upon the inner end of the shaft 5.

The central part of the table 1 is formed with a circular aperture surrounded by a hub 8. (See Figs. 1 and 3.) In this aperture is arranged the upper end 9 of a sleeve 10, the walls of the latter engaging the inner walls of the hub 8. The sleeve 10 is formed with a horizontal flange 11, raised against the lower side of the table 1 and secured thereto by bolts 12.

13 represents a hollow shaft arranged in the sleeve 10.

14 represents a bevel-gear secured to the hollow shaft 13 by a key 15 and a set-screw 16. The hub 17 of the gear 14 rests upon the top of the sleeve 10, thereby supporting the shaft 13 and the parts carried thereby in position. The gear 7 meshes with and turns the gear 14.

19 (see Fig. 21) is a cap secured by bolts 22 to the upper end of the hollow rotating shaft 13. This cap is formed with a channel 20 and a channel 21.

23 represents a stationary ring mounted upon the cap 19 in such manner as to permit the rotation of the cap in the ring. The ring 23 is formed with a groove 24, adapted to register with the upper outlet of the channel 20, and with a groove 25, adapted to register with the upper outlet of the channel 21. Packing-rings 26, seated by adjusting-screws 27, serve to prevent any leakage between the cap 19 and the ring 23.

28 represents a pipe one end of which is carried by the ring 23 in a position to communicate with the groove 25, and thus with the outlet of the channel 21.

29 represents a pipe arranged in a similar manner to the pipe 28, the free end of which communicates with the groove 24, and thus with the upper outlet of the channel 20. In practice a supply of cool water enters through the pipe 28 (see Figs. 1 and 21) and the groove 25 and channel 21, while the heated water returns by way of the channel 20, groove 24, and pipe 29.

30 represents a pipe connected at its upper end with the lower end of the channel 21 and passing down through the hollow shaft 13. 31 represents a like pipe arranged in the hollow shaft 13 and connected at its upper end to the lower outlet of the channel 20.

32 (see Fig. 10ᵃ) represents a pipe connected at one end to the outlet of the water-channel 33 in the rear welding-jaw 34, hereinafter described. The other end of the pipe 32 is connected to the inlet of a water-channel 35 in the forward welding-jaw 36, hereinafter described. The lower end of the pipe 30 connects with the inlet of the channel 33, while the lower end of the pipe 31 connects with the outlet of the channel 35, the water circulating by way of the pipe 30 and the channel 33 and by way of the pipe 32 and the channel 35, and then by way of pipe 31 back to the source of supply.

40 represents a sleeve secured upon the upper end of the shaft 13 by a set-screw 41 and adapted to rotate with the shaft.

42 represents a sleeve of insulating material arranged upon the sleeve 40 and formed with a flange 43, resting against a shoulder 44 on the sleeve 40. The sleeve 42 is also formed at its upper end with a flange 45. A nut 46 upon the upper end of the sleeve 40 is arranged to engage the flange 45, and thus secure the sleeve 42 upon the sleeve 40 between said nut and the shoulder 44. The sleeve 42 is formed with a central flange 460. The sleeve 42, the central flange 460, and the end flanges 44 and 45 are all formed of insulating material.

47 represents a ring of conducting material arranged upon the sleeve 42 between the flange 460 and the flange 45.

48 represents a wire connected at one end to the ring 47 and passing down through the hollow shaft 13 and connected with the primary coil 49 of the transformer.

50 represents a ring of conducting material upon the sleeve 42 between the flange 460 and the flange 43. 51 represents a wire connected at one end to this ring and connected at its lower end to an insulated contact-piece 512 on the end of the lever 71 of the circuit-breaker 70. (See Figs. 1 and 29.)

The secondary coil 52 of the transformer (see Fig. 3) is connected by a flexible terminal 53 to the forward welding-jaw 36, while the rear welding-jaw 34 is rigidly connected to the secondary coil by a terminal 54.

55 represents a bracket supported upon the bracket 3, its upper end being arranged to support the pipes 28 and 29. (See Fig. 1.) The bracket 55 carries an arm 56, to the free end of which are connected two brushes 57 58, adapted for engagement, respectively, with the rings 47 and 50.

59 and 60 represent feed-wires from the source of power to the brushes 57 58.

61 represents an arm secured to the bracket 55 and projecting over the bevel-gear 14. The free end of this arm is formed as a cam-finger 62. (See Figs. 1 and 29.)

70 represents a breaker-switch mounted upon and carried by the bevel-gear 14. The lever 71 of this breaker-switch carries a roll 72, adapted to be engaged with the cam-finger 62, in order to close the primary circuit at a predetermined time by bringing the contact-piece 512 in engagement with the end of the contact-spring 511, which in the operation of the machine is slightly in advance of the time when the two ends of the wire are brought in contact by the welding-jaws.

In Fig. 29 the primary circuit is represented by the wires 51, contact-piece 512, contact-spring 511, wire 513, and wire 48 back to the ring 47. The breaker-circuit is represented by the wires 78 and 79. The wire 79 leads from the terminal 80, secured to and insulated from the lower side of the rear welding-jaw 34, to the electromagnet 81 of the circuit-breaker 70. The wire 78 leads from the electromagnet 81 and passes about the transformer-core 781, thence to a breaker-switch terminal 82, secured to and insulated from the lower side of the forward welding-jaw 36. 83 represents a contact-spring carried by the terminal 80, while 87 represents a contact-screw carried by the terminal 82. The adjustment of the screw provides means whereby the end of the screw may contact with the end of the spring 83 at any predetermined point with relation to the position of the welding-jaws to each other, and thus enable the welding current to be automatically cut off at any predetermined point in the relative movement of the two welding-jaws toward each other.

Referring to Fig. 30, 100 represents the revolving head of the machine. This, as shown, is a box-shaped casting, with the sides omitted. In the bottom plate 101 of the casting is formed a hollow hub 102, provided with a key-seat 108, while in the top plate 103 of the casting is formed a complemental hub 104. 105 represents bearings formed on the top of the casting at the junction of the top plate 103 and the rear plate 106. In these bearings is arranged a shaft or pintle 107. The front plate 109 of the casting is beveled, as shown, from the center to each edge in order to permit the parts carried thereby to act on the curved blanks while bent around the former or drum. This plate 109 carries at either side a guide-plate 110. 111 represents a flanged guide-block secured to the top and center of the plate 109. This guide-block is formed with flanges 114, that coöperate with the flanges 115 on the guide-plates 110. 112 represents a cutter-block secured to the lower front side of the plate 109 below the block 111. The cutter-block 112 is formed with flanges 113, that constitute, in effect, a continuation of the flanges 114 on the block 111. The cutter-block 112, as shown, is formed with two projecting lugs or ears 116, carrying a pintle 117. To the lower ends of the lugs 116 is secured a stationary cutter-block 118. The plate 109 is formed with an aperture 119 between the blocks 111 and 112. In this aperture is arranged an arm 120 for the cutter-lever mechanism hereinafter described. (See Figs. 1, 2, 3, and 7.) 121 represents a cutter-head formed upon its lower side with an aperture 122, in which the pintle 117 is arranged to secure the cutter-head between the two lugs 116. The cutter-head at its upper end is formed with an aperture 123. 124 represents a link connected at one end to the free end of the arm 120 and at its opposite end carrying the pintle 125, arranged in the aperture 123. 126 represents a cutting-tool arranged in a slot in the cutter-head and maintained against displacement by means of a plate 127, secured to the cutter-head. 128 represents a set-screw arranged in the upper end of the cutter-head and with its operative or free end in engagement with the cutting-tool 126. By means of this set-screw the cutting-tool can be advanced, if desired, and maintained in its advanced or adjusted position. The cutter-head has a pivotal motion about the pintle 117 in order to force the cutting-tool 126 against the blank and sever the latter by means of its coaction with the stationary cutter 118.

Referring to Fig. 8, it will be seen that the cutting-tool 126 is so shaped that it projects below the blank in order to prevent the displacement thereof before the shearing action begins. The operation or stroke of the cutter is divided into two parts, one a positioning movement, or to the point shown in Fig. 8, after which the wire is gripped by other mechanism hereinafter described, and, second, a shearing action to sever the blank after such positioning movement hereinafter described has been effected.

Referring to Fig. 9, it will be seen that the cutter-block in its inoperative position is drawn up, so that the cutting-tool 126, as well as the cutter-block, is out of the path of the feeding of the wire onto the former or drum.

Referring to Figs. 3 and 30, the hub 102 is arranged upon the lower end of the hollow shaft 13 and rigidly secured thereto by means of a key 129 and a set-screw 130, so as to be supported and rotated by said shaft. The hub 104 is loosely arranged upon a complemental bearing formed upon the sleeve 10, so that the hub 102 and the head turn with the shaft 13, while the hub 104 turns upon the sleeve 10. 131 represents a cam-sleeve secured upon the sleeve 10 by means of a set-screw 132. 133 represents a path-cam formed on a sleeve secured by a set-screw 134. 135 represents a bracket secured to the lower face of the plate 103 of the revolving head (see Figs. 2 and 7) between the hub 104 and the plate 109. This bracket carries a pintle 136, upon which is mounted a hub 137. (See Fig. 7.) Cast integral with this hub is the arm 120, heretofore described, and the arm 138, the free end of which carries a roller 139, arranged in the path-cam 133, whereby the cutter-head is operated. In Fig. 2 will be seen two inclines of the path-cam 133, whereby the cutter-head is given, first, its positioning movement, as shown in Fig. 8, and subsequently its shearing motion to sever the wire or blank by the coaction of the cutting-tool 126 and the stationary cutter-block 118. 140 represents a ring secured to the lower face of the plate 101 by bolts 141. This ring is formed with a downwardly-projecting flange 142. This ring and flange extend around the rotating head, except for a relatively small space (see Fig. 1) occupied by the feeding-clamps, cutter, and welding-jaws. The flange 142 constitutes the former or drum, about which the wire 144 is drawn and formed or shaped. Said flange may be made slightly tapering to facilitate the removal of the wire.

In the drawings (see particularly Fig. 1) the hoop or band 145 is shown as circular. This particular shape, however, could be modified, if desired, depending upon the configuration given the former or drum 142. In other words, instead of being circular the product or hoop 145 might be square or angular.

Referring to Figs. 1, 12, 13, 14, 15, 16, and 18, 150 represents the forward feeding-clamp, and 151 the rear feeding-clamp. Each clamp is composed of a plate 152, formed with ribs 153, adapted to be slid under the flanges 113, 114, and 115 on the front face of the plate 109, (see Fig. 30,) whereby the plate and the parts carried thereby are enabled to have a sliding motion relative to the plane of the hoop. Each plate 152 is provided at its upper end with a pintle 156, upon which is loosely mounted a roller 155.

Referring to Fig. 3, 157 represents plates secured to the under side of the table 1, forming a path-cam in which is arranged the roller 155 of the forward feed-clamp 150. 158 represents plates secured to the lower side of the table 1, forming a cam-track for the roller 155 of the rear feed-clamp 150. (See Figs. 3, 6, and 12.) By this arrangement as the rolls 155 travel along their respective path-cams the plates 152 are slid up and down at predetermined intervals in the ways formed by the flanges 114 115, as hereinbefore described. 160 represents a pintle projecting from the plate 152 midway between its ends on the front side. Upon this pintle is mounted a hub 161, provided at its inner end with a cam 162 and formed with a downwardly-projecting finger 163 and an upwardly-projecting finger 164, the free end of which carries a roller 165. (See Figs. 32, 33.) The hub 161 and the parts carried thereby for the two feed-clamps have, as seen in Figs. 32, 33, a general construction in common. The arm 164 on the forward feed-clamp is farther away from the plate 152 than is the arm 164 on the rear feed-clamp. Further, it will be noted that the cams 162 of the two clamps face each other, so that it is necessary to have their operating-faces arranged in opposition in order that the same motion of the arm 164 may produce the same movement in the clamp. 170 represents a lug secured to the plate 152 nearest its lower end and provided with a pintle 171. 172 represents a lever pivoted between its ends upon the pintle 171. The upper end of this lever is provided with a roller 173, adapted to be engaged by the cam 162 on its respective plate 152. To the lower end of the lever is secured a removable clamping-piece 174. 175 represents a complemental removable clamping-piece secured to the lower end of the plate 152. The plate 174 is formed with a groove 176, adapted to partially inclose the blank or wire 144 in order to force it against the plate 175 and maintain the same in position. 177 represents a spring arranged to normally force the plates 174 175 apart. 181 represents a lug secured to the lower side of the cam 157 (see Fig. 6) in position to engage the roller 165 on the forward feed-clamp 150. 182 represents a similar lug secured to the under side of the plate 157 in position to be engaged by the roller 165 of the rear feed-clamp. The arm 164 on the forward feed-clamp is spaced away from the plate 152 sufficient to permit the finger 182 to pass between the roller 165 and said plate. This arrangement permits a compact assembling of parts and the operation of the two feed-clamps at the proper time. In the rotation of the machine as the roller 165 of the forward feed-clamp engages the finger 181 its cam 162 is rocked downward, as in Fig. 14, thereby forcing the plates 174 175 toward each other, gripping the wire between them. At the end of this stroke the roller 173 rides into a depression 178 on the top of the cam 162, thereby locking the lever in its operative position, with the blank or wire firmly held between the two plates 174 175. 185 (see Fig. 1) represents an arm secured to the under side of the table 1, formed with a lower end or finger 186, adapted to engage the lower end of the lever 163 of the forward feed-clamp in order to reverse the cam 162 and permit the spring 177 to separate the plates 174 175 and release the wire. 187 represents a similar arm secured to the under side of the table 1, formed with a finger 188, adapted in like manner to engage the lower end of the lever 163 on the rear feed-clamp to unlock the clamp to permit the spring 177 to force the plates 174 175 apart, as above described in connection with the forward feed-clamp. The parts are so arranged that the cam 162 is operated to clamp the wire and hold the same for a predetermined time, when the levers 163 are engaged by the fingers 186 188 in order to move the cams in the opposite direction and unlock the clamp.

Referring to Figs. 16, 17, 18, and 19, 190 represents a curved bar formed at one end with a pin 191, secured in a block 192, attached to the under surface of the plate 140 inside the flange 142. (See Fig. 3.) This bar is formed with three fingers 193, that project through slots 194, formed in the flange 142. (See Figs. 2, 16, 18, 23, 28.) The finger 193 on the free end of the bar 190 is formed with an extension provided with an enlarged aperture 195. (See Fig. 34.) 196 (see Figs. 16 to 18 and Fig. 34) represents a lug carried by the lower end of the rear feed-clamp and provided with a pintle 197, loosely arranged in the aperture 195. 198 represents a spring connected at one end to the forward finger 193 and at its upper end to the pintle 197 and acting normally to maintain the positioning-bar 190 in its raised position, (shown in Fig. 16,) except when the rear feed-clamp is depressed by means of the cam 158, (see Fig. 3,) as hereinbefore described. The loose connection between the pintle 197 and the extension of the finger 193 enables the rear feed-clamp to have a motion independent of said positioning-ring.

Fig. 34 shows the position of the parts in which they appear in Fig. 23. It is necessary, however, at one stage of the operation that the rear feed-clamp assume a higher position than that shown in Fig. 23 or, in other words, the position shown in Fig. 25 in order to permit the clamp to get a new hold on the blank to form the next hoop. During this motion the pintle 197 travels nearly to the upper end of the aperture 195. 220 represents a casting secured to the lower front side of the plate 101 by bolts 221. The casting 220 is insulated from the plate 201 in any desired or preferred manner. The rear welding-jaw 34 (see Fig. 10) is composed of a piece of copper secured to the casting 220 by bolts 223 or in any preferred way. The top part of the rear welding-jaw 34 is cut away in order to permit the rear feed-clamp to depress the wire or blank into position to be gripped by the welding-jaw. 230 represents a short shaft arranged in the casting 300. (See Fig. 20.) This shaft is formed with a collar 231 to maintain the shaft against inward motion. 232 represents a pitman mounted on an eccentric stud which is carried by the inner end of said shaft. The free end of this pitman is turned up and carries a removable gripping-plate 233, adapted to grip the wire or blank between said plate and the face of the forward welding-jaw 36. 234 represents an arm secured to the end of the shaft 230. The pitman 232 is arranged on the inner vertical face of the casting 300. (See Fig. 4.) 236 represents a pin on the inner face of the shaft 230. 237 represents a leaf-spring, one end of which is connected to the rear end of the pitman 232, while the free end rests upon an insulated strip 238 between the forward welding-jaw 36 and the terminal 82. (See Fig. 11.) The pitman is moved out and in by the shaft 230, the pin 236 serving as the pitman is forced outward to also force the free end of the pitman downward against the tension of the spring 237 in order that the hoop may pass over the free end of the pitman. (See Fig. 8 as an illustration of this mode of operation in connection with the pitman of the forward welding-jaw 36.) 239 represents a pin secured to the rear welding-jaw 34 and projecting outward opposite the front end of the pitman 232 or gripping-plate 233 (see Fig. 10) in order that as the free end of the pitman is swung out and down the hoop may slide on the pin 239 over the free end of the pitman. (See Fig. 8 as an illustration of this construction in connection with the forward welding-jaw 36.) 240 represents a link connected at one end to the free end of the arm 234. 241 (see Fig. 2) is a lever pivoted at its rear end on the pintle 107. This lever is provided with an upwardly-projecting arm 242, carrying a roller 243, arranged in the path-cam 244, secured to the sleeve 10 by a set-screw 245. (See Fig. 3.) As shown in Fig. 2, the lever 241 at its free end is connected with the upper end of the link 240 and is insulated therefrom in any preferred way. The forward welding-jaw carries a clamp mechanism comprising a shaft 230, clamp-plate 233, pitman 232, in all respects like the construction just described in connection with the rear welding-jaw. (See Fig. 7.) 250 represents the link of the forward welding-jaw, corresponding to the link 240 of the rear welding-jaw. 251 represents an arm of the same general construction as the arm 241 and pivoted at its rear end to the pintle 107. This arm 251 carries a roller 252, arranged in the path-cam 253, secured to the lower side of the table 1, (see Fig. 3,) adjacent to the path-cam 244. The link 250 is connected at its upper end to the free end of the arm 251 and insulated therefrom. By means of the construction described the gripping-plates of the welding-jaws grip the wire and release the same at predetermined points. The mechanism for operating the forward welding-grip is constructed to work without cramping whether the welding-jaws are close together, as at the completion of a weld, or are drawn apart ready to receive the wire.

Referring to Fig. 8, 253 represents a plate secured to the inner side of each welding-jaw and projecting down over the pitman 232 in order to maintain it in place.

Referring to Figs. 9 and 35, 300 represents a casting corresponding to the general arrangement of the casting 220 of the rear clamp. This casting 300 is formed with a boss 301, mounted upon and insulated from the lower end of the shaft 302, that is arranged in a boss on the plate 101. Referring to the dotted lines in Fig. 9 and the full lines in Figs. 11 and 35, 303 represents a plate projecting upward from the casting 300 and carrying at its upper end a boss 304, mounted upon and insulated from the upper end of shaft 302. (See Figs. 8 and 11.) 305 represents an arm projecting from the boss 304 and carrying at its free end a roller 306, arranged to engage a cam 131. (See Figs. 2, 3, and 4.) A set-screw 307 (see Fig. 2) prevents the shaft 302 from turning.

Referring to Fig. 4, 310 represents a lug formed on the hub 102. In this lug is arranged a set-screw 311. 312 is a coiled spring, one end of which is carried by the free end of the set-screw 311, while the other end is arranged upon a pin 313, projecting from the rear face of the casting 300. By the described construction the forward welding-jaw through the medium of cam 131 and the roller 306 and its connected parts is drawn away or separated from the rear welding-jaw, while by means of the spring 312 the forward welding-jaw is advanced toward the rear welding-jaw to force the ends of the wire together with a yielding pressure and effect the upset as the metal softens, it being observed that the jaws are forced toward each other and their wires held in contact with a yielding pressure, while they are separated by positive pressure. The forward welding-jaw 36, like the rear welding-jaw 34, is composed of copper and secured to a casting 300 by screws 223.

Figure 25:
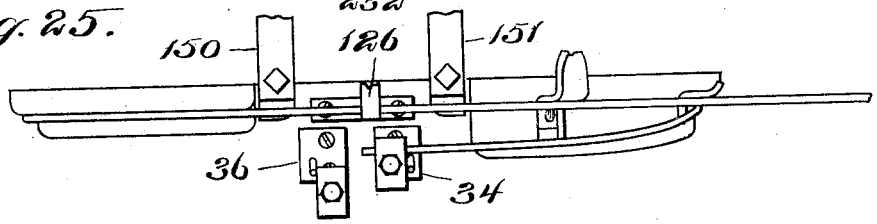
Figure 26:
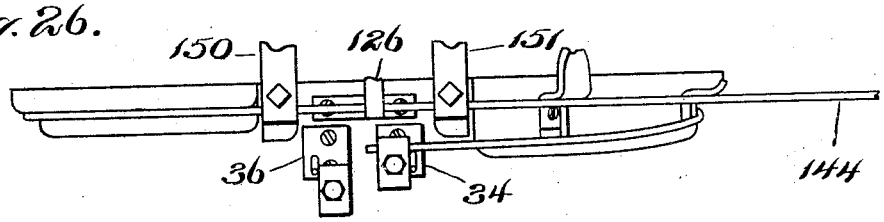
Figure 27:
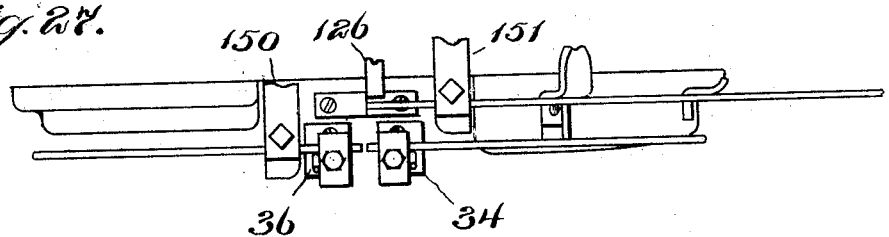

The operation of the mechanism hereinbefore described is as follows: Referring to Fig. 1, the wire 144 is drawn in from the source of supply through a straightener 400, secured to a leg of the machine. The wire is then passed around the former or drum 142 and clamped in the rear feeding-clamp 151, (see Fig. 23,) with its free end against the cutter-block 118. With the end of the blank secured as shown in Fig. 23 the machine is started. As the drum continues to revolve the rear feeding-clamp 151 draws the wire to the former, and at a certain point the said clamp is depressed by its cam to the position shown in Fig. 24 in order to place the end of the wire into the rear welding-jaw 34. Thereafter the rear feeding-clamp rises to the position shown in Fig. 25, and this takes place just before an entire blank has been wound upon the former, so that after the wire has been wound onto the former this clamp at a proper point may be automatically depressed to engage the wire, as heretofore described and as shown in Fig. 26. After the rear feeding-clamp 151 has delivered the wire to the rear welding-jaw 34 and is in a position shown in Fig. 25 the forward feeding-clamp 150 is then depressed to grasp the wire. (See Fig. 26.) After the forward feeding-clamp 150 has grasped the wire, as shown in Fig. 26, the wire is then grasped by the rear feeding-clamp 151, and immediately thereafter the cutting-tool 126 is operated to sever the wire. After the wire is cut the forward feeding-clamp 150 is moved down by its cam in order to deliver the end of the wire carried by it to the forward welding-jaw 36. (See Fig. 27.) The forward feeding-clamp immediately rises to the position shown in Fig. 28 above the path of the on-feeding wire. After the wire has been delivered, as described, to the forward welding-jaw the latter is forced toward the rear welding-jaw by the spring 312 (see Fig. 4) in order to abut the two ends of the wire together. This action of the spring 312 continues as the metal softens until the point of the screw engages the contact-spring 83, closing the breaker-circuit, energizing the magnet 81, and breaking the primary circuit between the block 512 and the spring 511. (See Fig. 29.) As the rear feeding-clamp 151 descends from the position shown in Fig. 23 to the position shown in Fig. 24 in addition to the operation already described it further by means of the curved bar 190 and the fingers 193 forces the wire 144, that is upon the former, down, so that before sufficient wire has been drawn upon the drum to form a complete blank, as shown in Fig. 25, the wire to be held by the rear welding-jaw 34 is depressed out of the plane of feed, and, further, while both ends of the wire are grasped by the welding-jaws, and after the hoop is released from the welding-jaws (see Figs. 27 and 28) the hoop is practically free from the drum. The curved bar 190 not only assists the rear feeding-clamp 151 in moving the wire 144 on the flange of the former, but insures regularity in such movement and a consequent uniformity in the size of the hoops.

It will be seen from Fig. 1 that the feeding-clamps pass down outside of the welding-clamps, and although not perceptible on the drawings the two feed-clamps move down on slightly-divergent lines to afford a slight clearance-space between the ends of the wire when being placed in the welding-clamps. If the ends were brought down on parallel lines, a slight fin on one end might cause the two ends to interfere and prevent the proper alinement of the wires in the welding-clamps. The clearance is clearly shown in Figs. 4 and 27. The diverging movement of the feed-clamps also serves to loosen the wire on the former as it is moved down. It will be seen that the two feed-clamps are independent of each other. Referring to Figs. 12 and 30, it will be seen that the feeding-clamps are arranged at an angle, so that the dies may be easily adapted to the curvature of the hoop, and also that the cam-rolls 155 may run properly on their respective cams.

To adapt the machine to hoops of different size or shape, it is sufficient, so far as the feeding-clamps are concerned, to attach clamping-dies formed to the proper angle or curvature.

It will be seen from Figs. 2 and 3 that the feeding and welding clamps and also the cutter are arranged in a way to be readily adapted to the use of dies suitable for gripping metal strips other than round in section, such as flat or crescent-shaped.

When it is desired to build a machine for making hoops of relatively small diameter, the transformer may be placed above the line of the on-feeding wire, thus permitting the use of a much smaller former.

If it is found that the wires do not free themselves from the clamps as quickly as may be desired, various forms of knock-out levers or springs may be used in proximity to the welding-jaws, operated by any suitable mechanism to force the wires from the dies at each revolution of the machine.

Figure 24:
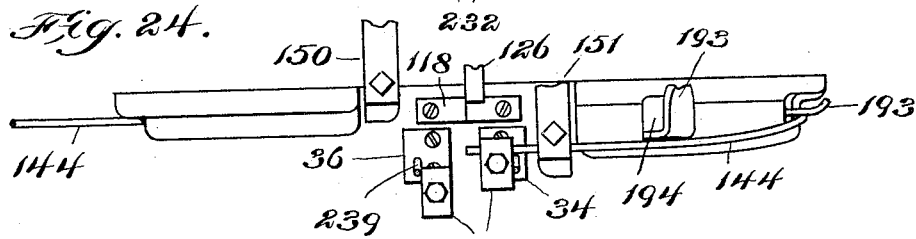

It will be seen in Figs. 23 and 24 that if a wire should stick to one of the welding-dies, the downward motion of the rear feeding-clamp would strike the wire and knock it off, thus serving as a positive shedding device to prevent a completed hoop remaining in the machine too long.

The operation, as described, continues, the blanks being automatically fed, shaped, positioned, cut, welded, and discharged as complete independent hoops.

Having thus explained the nature of my invention and described a way of constructing and using the same, though without attempting to set forth all of the forms in which it may be made or all of the modes of its use, what I claim, and desire to secure by Letters Patent, is—

1. A machine for making a series of independent hoops from a metallic strip of indeterminate length, said machine having provisions for cutting and bending successive lengths of said strip into predetermined shape with the ends in juxtaposition, and means for successively welding the meeting ends of the said lengths.

2. A machine for making a series of independent hoops from a metallic strip of indeterminate length, said machine having provisions for feeding, bending and cutting said strip into successive lengths with their ends in juxtaposition, and means for successively electrically welding the meeting ends of the said lengths.

3. A machine for making independent hoops comprising means for bending a metallic strip of indeterminate length to the required form, means for severing the strip at a predetermined point, and means for positioning and electrically welding the ends of the severed portion.

4. A machine for making successive independent hoops, comprising a "former," means for bending elongated metal about said "former," guides for receiving and holding said metal, and means for electrically welding the meeting ends of said metal to form an independent hoop or band.

5. A machine for making successive independent hoops comprising means for bending a metallic strip into a loop, means for positioning the ends of said loop in alinement, and means for electrically welding the said ends to form an endless band.

6. A machine for making independent hoops comprising the following instrumentalities, to wit: "forming" mechanism, severing mechanism, positioning mechanism, and welding mechanism, said instrumentalities operating to bend the end of a metallic strip into a loop, to sever said bent portion or loop, to position the ends of said severed portion, and to electrically weld the said ends to form a hoop.

7. A machine of the character referred to comprising the following instrumentalities, to wit: a rotating "former" having means for clamping a metallic strip and forming a loop thereof, and electrical welding means rotatable with "former" for welding the ends of said loop.

8. A machine of the character referred to comprising the following instrumentalities, to wit: loop-forming mechanism, electric welding mechanism, and mechanism for independently discharging a formed and welded band.

9. A machine of the character referred to comprising the following instrumentalities, to wit: band-forming mechanism, severing mechanism and welding mechanism, said instrumentalities being arranged and operated whereby when the ends of one band are being welded, another independent band is being formed.

10. A machine of the character referred to comprising the following instrumentalities, to wit: mechanism for forming successively a plurality of loops, mechanism for severing the formed loops, mechanism for electrically welding the ends of the formed and severed loops, and mechanism for discharging the welded bands, the said instrumentalities operating to continuously form and weld independent bands from a metallic strip of indeterminate length.

11. A machine of the character referred to comprising the following instrumentalities, to wit: means including a "former" for bending the metallic strip into a loop around said "former" and severing the same, mechanism for loosening said loop on said "former," and means for electrically welding the ends of the loop to form an independent band.

12. A machine of the character referred to comprising the following instrumentalities, to wit: means including a "former" and clamping device thereon for bending a metallic strip into a loop, and welding mechanism including electrodes having independent clamping devices for moving the ends of the wire of one loop together during the welding thereof.

13. A machine of the character referred to comprising the following instrumentalities, to wit: mechanism including a rotating "former" with a feeding-clamp thereon for bending a metallic strip into a loop, welding mechanism having electrode-clamps for clamping the ends of the loop, and means whereby the ends of the loop are transferred from the feeding-clamps to the electrode-clamps.

14. A machine of the character referred to comprising the following instrumentalities, to wit: a support, means for winding the end of a metallic strip of indeterminate length around said support to form a loop, means for severing the said loop, and means for positioning and electrically welding the ends of one loop independently of the other loops.

15. A machine of the character referred to comprising the following instrumentalities, to wit: a support, means for bending a metallic strip of indeterminate length into successive loops around said support, mechanism for severing and positioning the loops successively as they are formed, electrical welding devices for welding the ends of a loop, and mechanism for releasing or discharging the welded band.

16. A machine of the character referred to comprising the following instrumentalities, to wit; a support, means for feeding a metallic strip around said support to form a loop, means for severing the loop, means for moving said loop from the line of feed of the strip, and means for electrically welding the ends of the severed loop to form an independent endless band.

17. A machine of the character referred to comprising a continuously-rotating mandrel, means on said mandrel for clamping a metallic strip thereto and winding it therearound, severing mechanism for cutting the said strip into lengths, and welding mechanism rotating with said mandrel for welding the ends of said lengths.

18. A machine of the character referred to, having a rotatable welding mechanism, and a detachable mandrel or former arranged to permit one mandrel to be substituted for another.

19. A machine of the character referred to comprising automatic loop-forming mechanism, electric welding mechanism for holding and uniting the ends of a loop to form an endless band, and an automatic device for controlling the electric current through the welding mechanism.

20. A machine of the character referred to comprising loop-forming mechanism, means for positioning and separating the ends of the loop while said ends are being brought into alinement, and means for electrically welding the ends of the loop together to form an independent hoop.

21. In a machine of the character referred to, means for forming and electrically welding a blank to form a hoop, said means including a cutter moving with the feeding-wire, whereby loops may be formed, severed and welded without stopping the machine.

22. In a machine of the character referred to, means for forming and electrically welding a blank to form a hoop, said means including a cutter arranged to sever the wire at a predetermined point to form a loop while the loop immediately following is being formed.

23. In a machine of the character referred to, means for forming and electrically welding a blank to form a hoop, said means including a cutter, one member of which is arranged to act as a temporary support for the wire while it is being fed in place.

24. In a machine of the character referred to, welding-clamps, and means for automatically placing and holding the ends of a blank in alinement, and means for causing the blank to be thereafter engaged by the welding-clamps.

25. In a machine of the character referred to, welding means, cutting means, and means for clamping and holding a blank arranged to hold the blank while it is being cut and thereafter to move the ends of the blank successively into position to be engaged by the welding means.

26. In a machine of the character referred to, a pair of clamps, and means for automatically operating the same to position the loop previous to welding, to loosen the loop on the mandrel, to remove the loop from its guide or "former" sufficiently to clear the next infeeding loop, and to insure the free discharge of the completed or welded loop.

27. In a machine of the character referred to, a pair of clamps, means for operating the same to clamp the wire and hold it between said clamps while it is being cut to form the blank, to translate the ends of the said wire successively in position for welding, the movement of translation of the clamps being such that they diverge as they approach the line of weld, thus giving clearness to the ends of the blank held by the clamps, and preventing interference as they are brought successively to the welding position.

28. In a machine of the character referred to, feeding-clamps in combination with welding-clamps, said feeding-clamps being adapted to place the ends of the blank into the welding-clamps, and immediately after the clamping of the welding-clamps and previous to the application of the welding-current to free themselves from the blank to permit the free action of the welding-clamps.

29. In a machine of the character referred to, a "former," adapted to receive and form a strip of metal to the desired shape and permit the electrical welding of said strip to take place while around said "former," and permit the free discharge of the completed hoop.

30. In a machine of the character referred to, a "former," electrical welding apparatus placed within said "former" and having its jaws arranged to protrude through said "former," whereby they may grasp the ends of the blank to weld the same, without interfering with the feed or other steps in the formation of the hoop.

31. In a machine of the character referred to, welding-jaws, a former or mandrel, a pair of clamps arranged within said former, projecting through the latter, said clamps being adapted to successively place the ends of a blank in position where they will be clamped by the welding-jaws without interfering with the feeding of the blank or the welding operation.

32. In a machine of the character referred to, means for welding the ends of a blank together to form a hoop while the welding device is in motion, together with the hoop, about the center of rotation of the hoop.

33. In a machine of the character referred to, welding means including welding-jaws, means for successively forming hoops of uniform size or diameter, said means including mechanism for automatically and positively placing the ends of the blanks into said welding-jaws with the same amount of projection for each succeeding hoop, said parts being timed to weld the ends of the blank when positioned.

34. In a machine of the character referred to, feeding means in combination with welding means, said feeding means being arranged to positively place the ends of the blank into the welding means, and thereafter previous to the application of the welding-current, free themselves from the blank to permit the free action of the welding means.

35. In a machine of the class described, a feeding-clamp, a cutter arranged in the path of the feed of the wire, and means for preventing the displacement of the wire relatively to the cutter, during the preliminary movements of the clamp.

36. In a machine of the character referred to, a former or mandrel, a forward feeding-clamp, a rear feeding-clamp provided with a displacing-bar, and means for giving the rear clamp its feeding motion, whereby a predetermined length of blank on the former will be displaced simultaneously with the portion carried by said rear clamp.

37. In a machine of the class described, two or more feeding-clamps each provided with a projecting jaw or ledge, adapted to receive the wire as it is wound upon the machine, said clamps being provided with movable jaws adapted to engage the wire at predetermined times.

38. In a machine of the character referred to, a former or mandrel, welding-jaws, feeding-clamps arranged to hold a blank fed upon the former, a cutting device arranged to sever the blank at a predetermined point, means for causing the clamps to present the blank to the welding-jaws after said cutting operation, and means for positively removing the welded hoops from the welding-jaws.

In testimony whereof I have affixed my signature in presence of two witnesses.

JOHN C. PERRY.

Witnesses:
P. W. PEZZETTI,
C. F. BROWN.